United States Patent

[11] 3,543,877

| [72] | Inventors | Gaston Jean Louis Ranvier<br>Issy-les-Moulineaux;<br>Gerhard Richter, Dammarie-les-Lys,<br>France |
| --- | --- | --- |
| [21] | Appl. No. | 741,551 |
| [22] | Filed | July 1, 1968 |
| [45] | Patented | Dec. 1, 1970 |
| [73] | Assignee | Societe Nationale D'Etude de Construction<br>de Moteurs d'Aviation<br>Paris, France<br>a company of France |
| [32] | Priority | March 27, 1968, July 7, 1967 |
| [33] | | France |
| [31] | | Nos. 145,218 and 113,650 |

[54] SILENCER DEVICE FOR AN EJECTOR-TYPE JET PROPULSION NOZZLE
18 Claims, 19 Drawing Figs.

[52] U.S. Cl. .................................................. 181/51;
239/127.3, 239/265.13, 239/265.17
[51] Int. Cl. ..................................................... F01n 1/14;
B64d 33/06
[50] Field of Search .................................................. 239/265.13,
127.3, 265.17, 265.41; 181/33.221, 33.222, 33.22,
43, 51, 58

[56] References Cited
UNITED STATES PATENTS

| 3,027,714 | 4/1962 | Parker............................ | 239/265.13 |
| --- | --- | --- | --- |
| 3,032,981 | 5/1962 | Lawler........................... | 239/265.13 |
| 3,347,467 | 10/1967 | Carl et al. ..................... | 239/265.13 |
| 2,997,845 | 8/1961 | Oulianoff....................... | 239/265.17 |
| 3,333,772 | 8/1967 | Bruner.......................... | 181/33(.222) |
| 3,420,442 | 1/1969 | Teagle........................... | 239/127.3 |

FOREIGN PATENTS

| 859,993 | 1/1961 | Great Britain................ | 181/33(.222) |
| --- | --- | --- | --- |

Primary Examiner—Robert S. Ward, Jr.
Attorney—Watson, Cole, Grindle & Watson

ABSTRACT: A silencer device, for ejector-type jet propulsion nozzle comprising a primary nozzle and a secondary fairing, said propulsion nozzle having, distributed around the internal periphery of the secondary fairing and downstream of the outlet section of the primary nozzle, a series of baffles such as strips or vanes each of which can be displaced between an operative position in which its upstream extremity penetrates into the primary jet stream in the manner of a scoop, and an inoperative position in which it is retracted into said fairing.

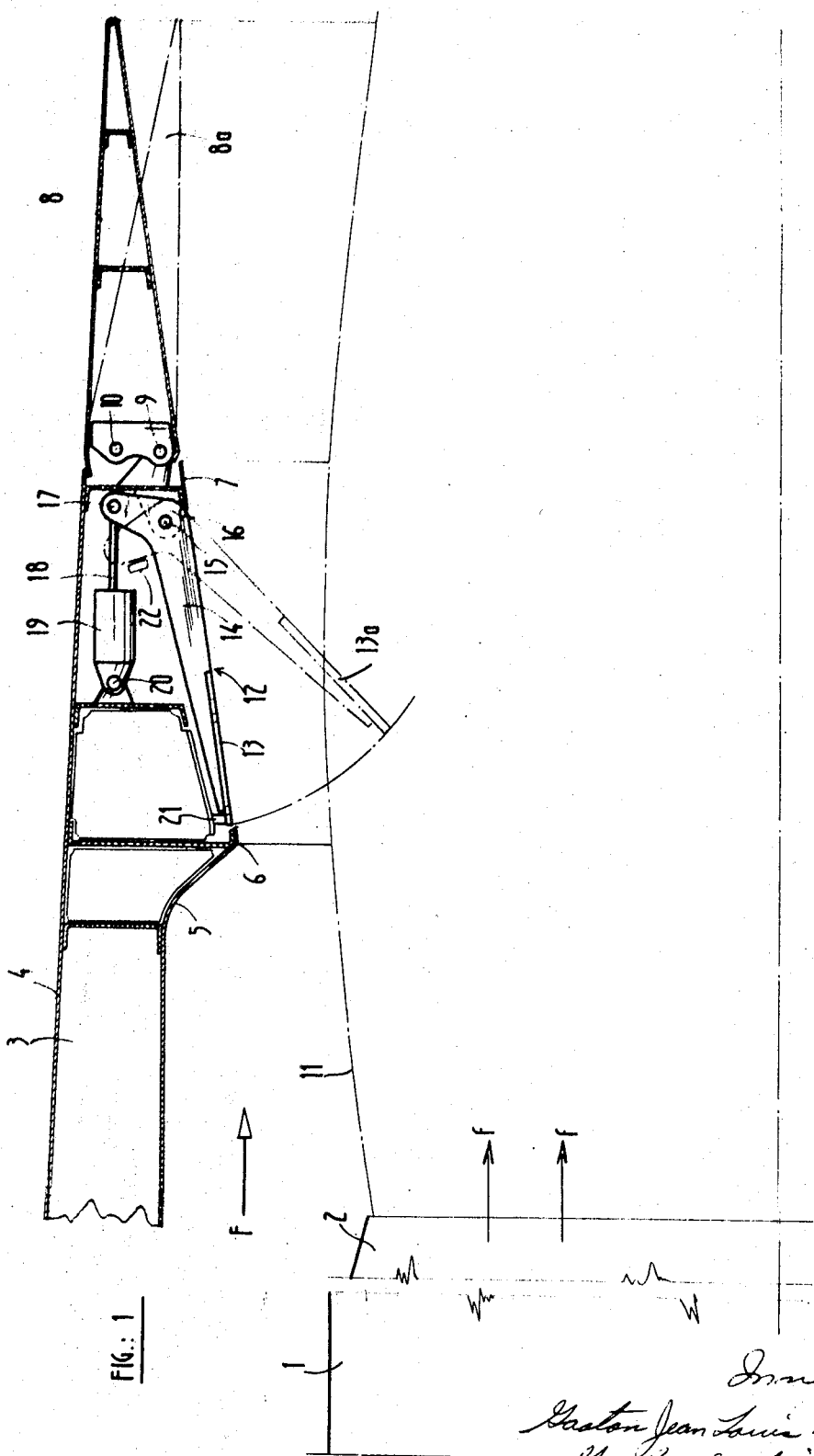

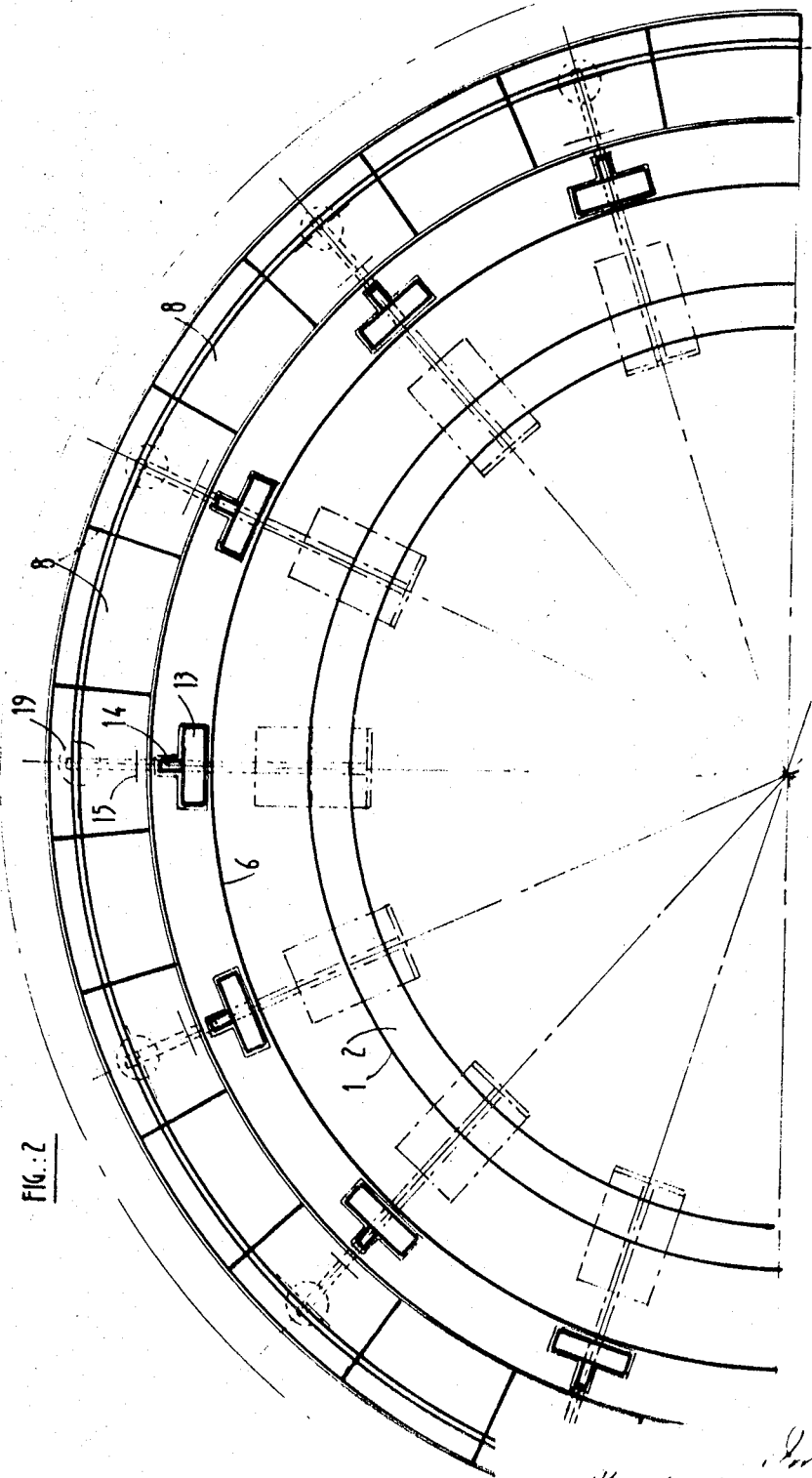

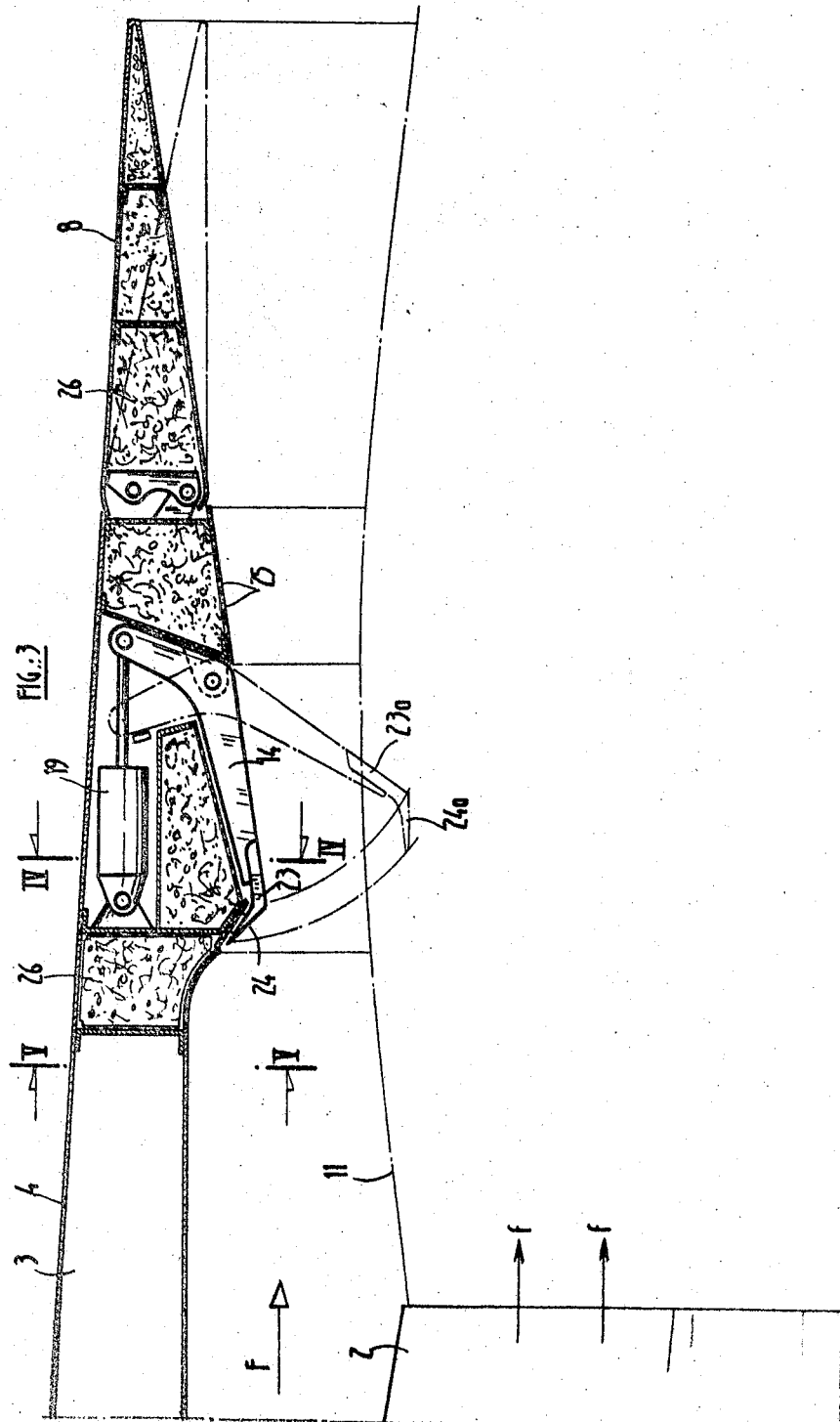

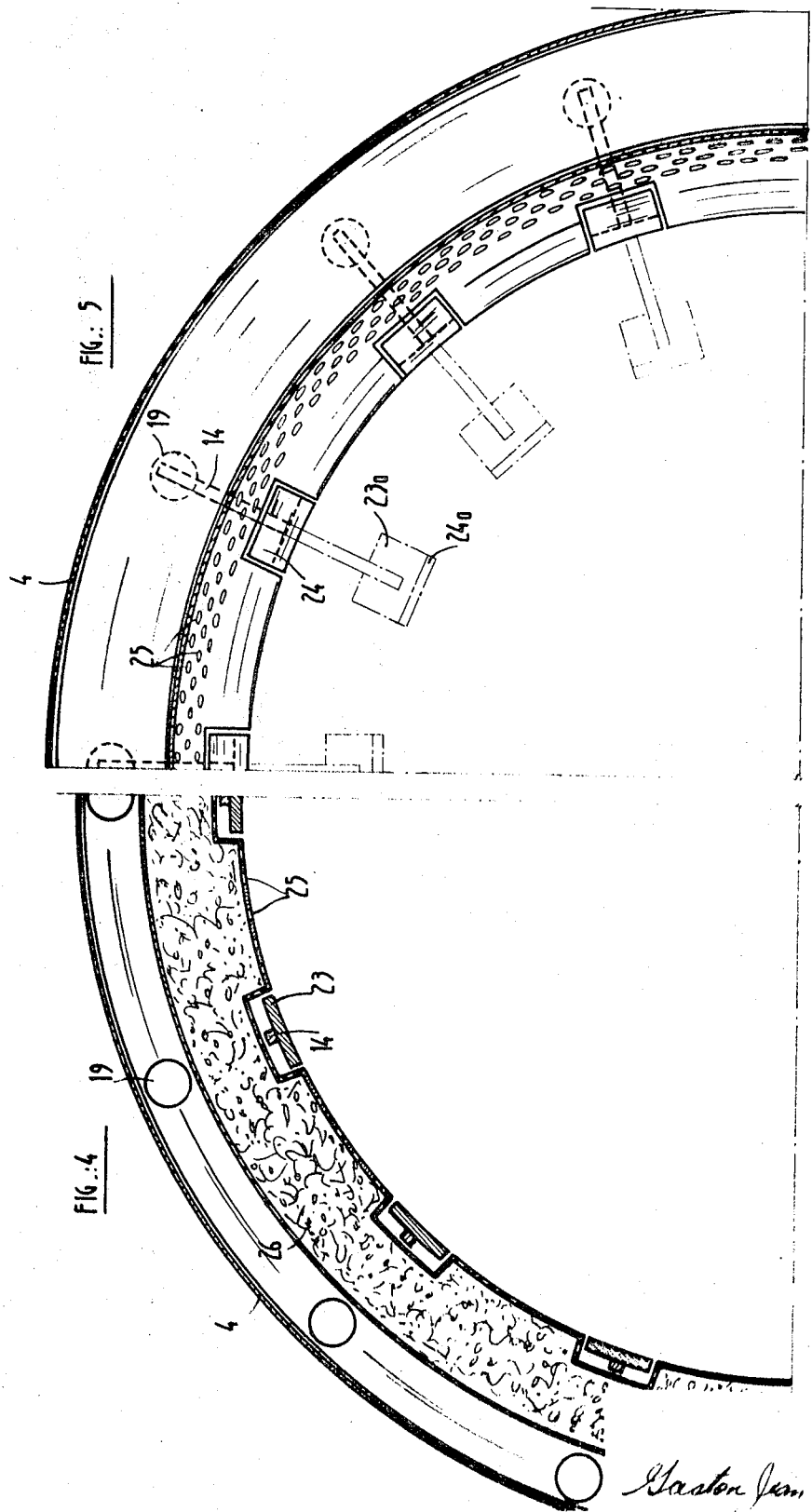

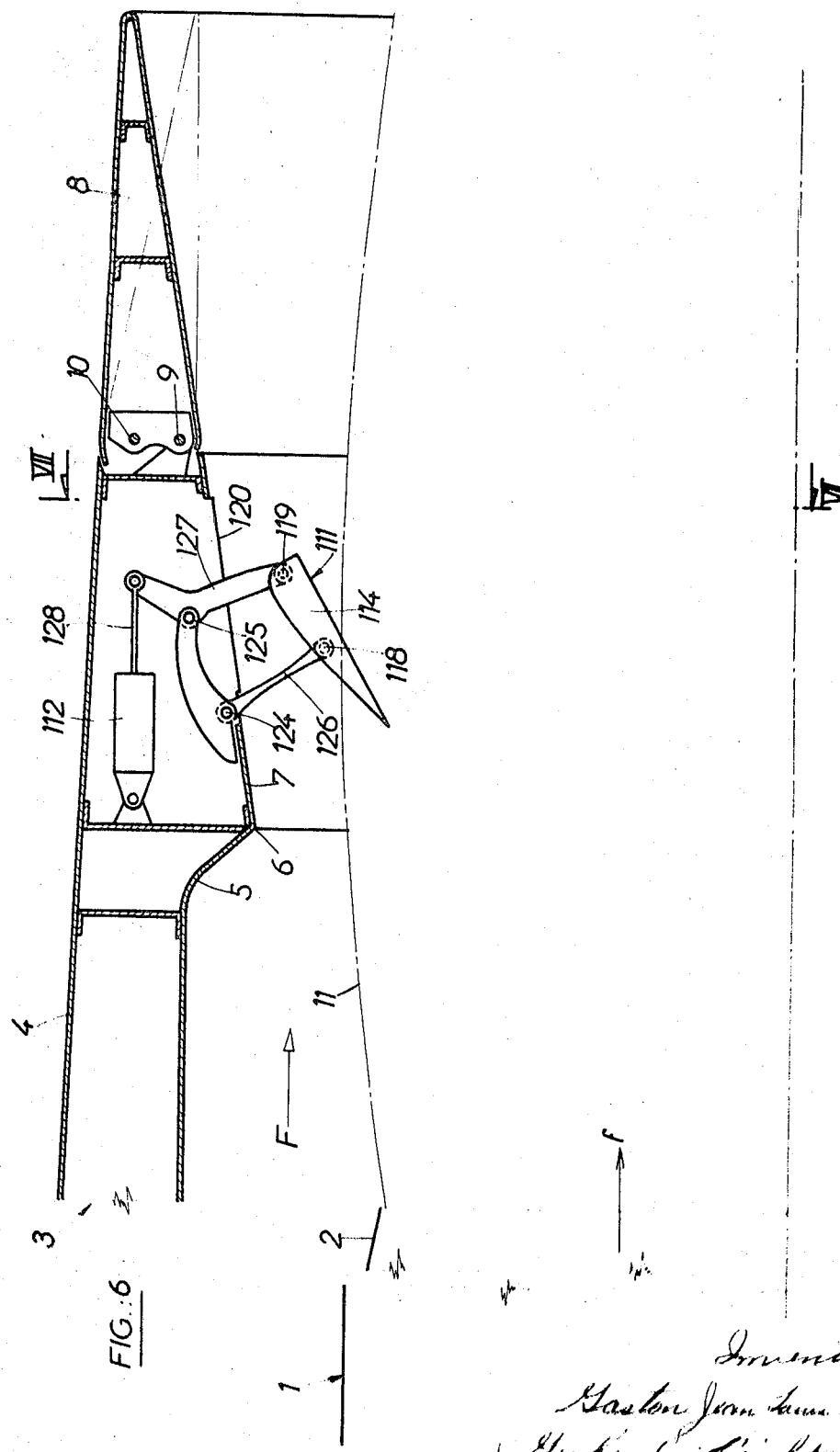

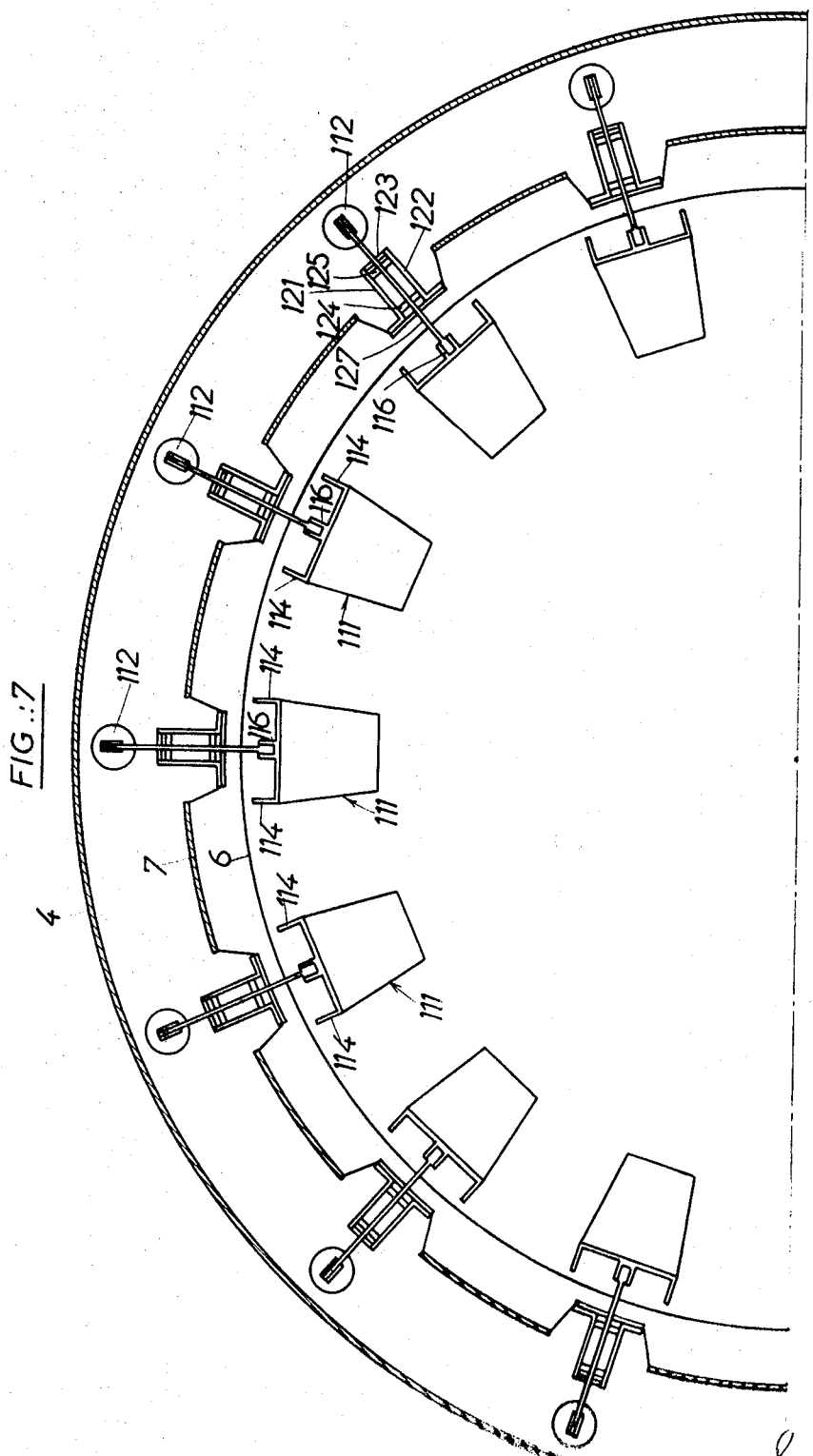

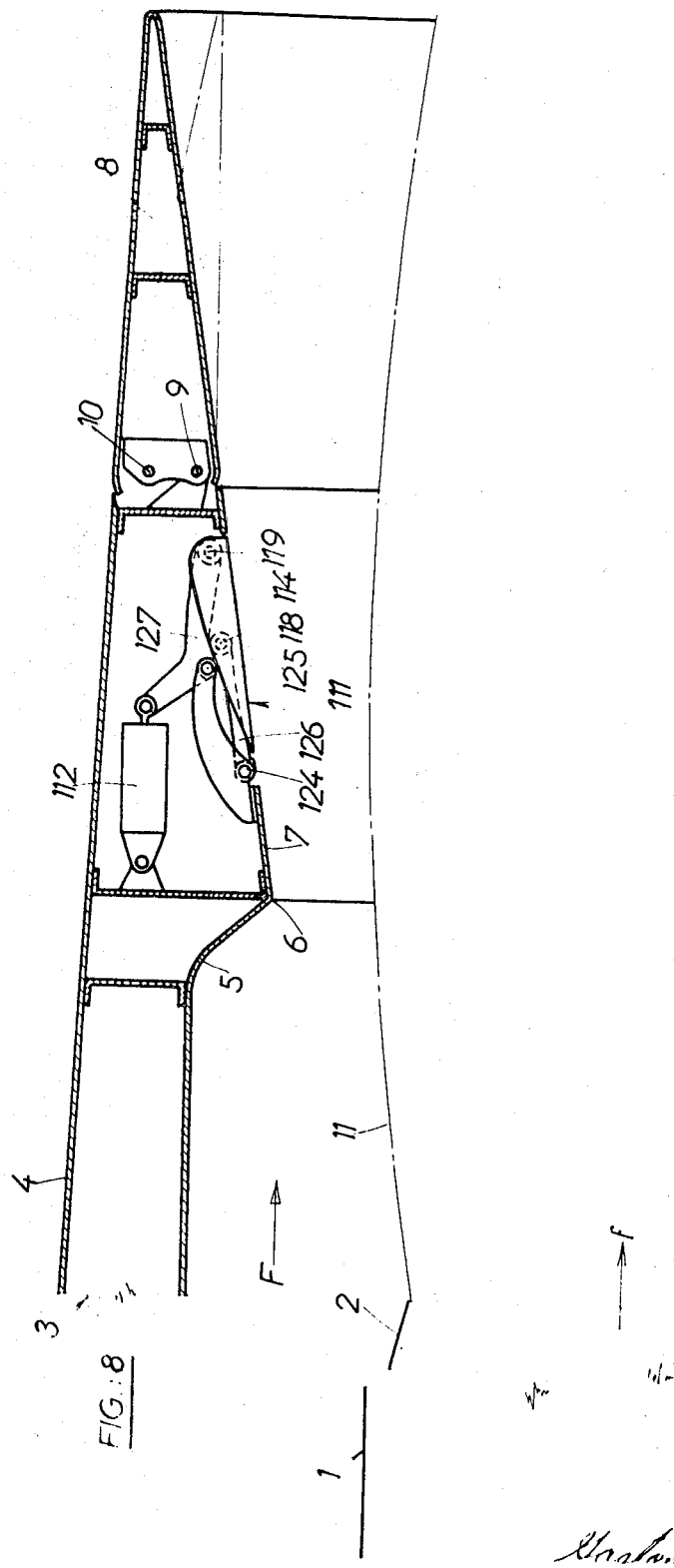

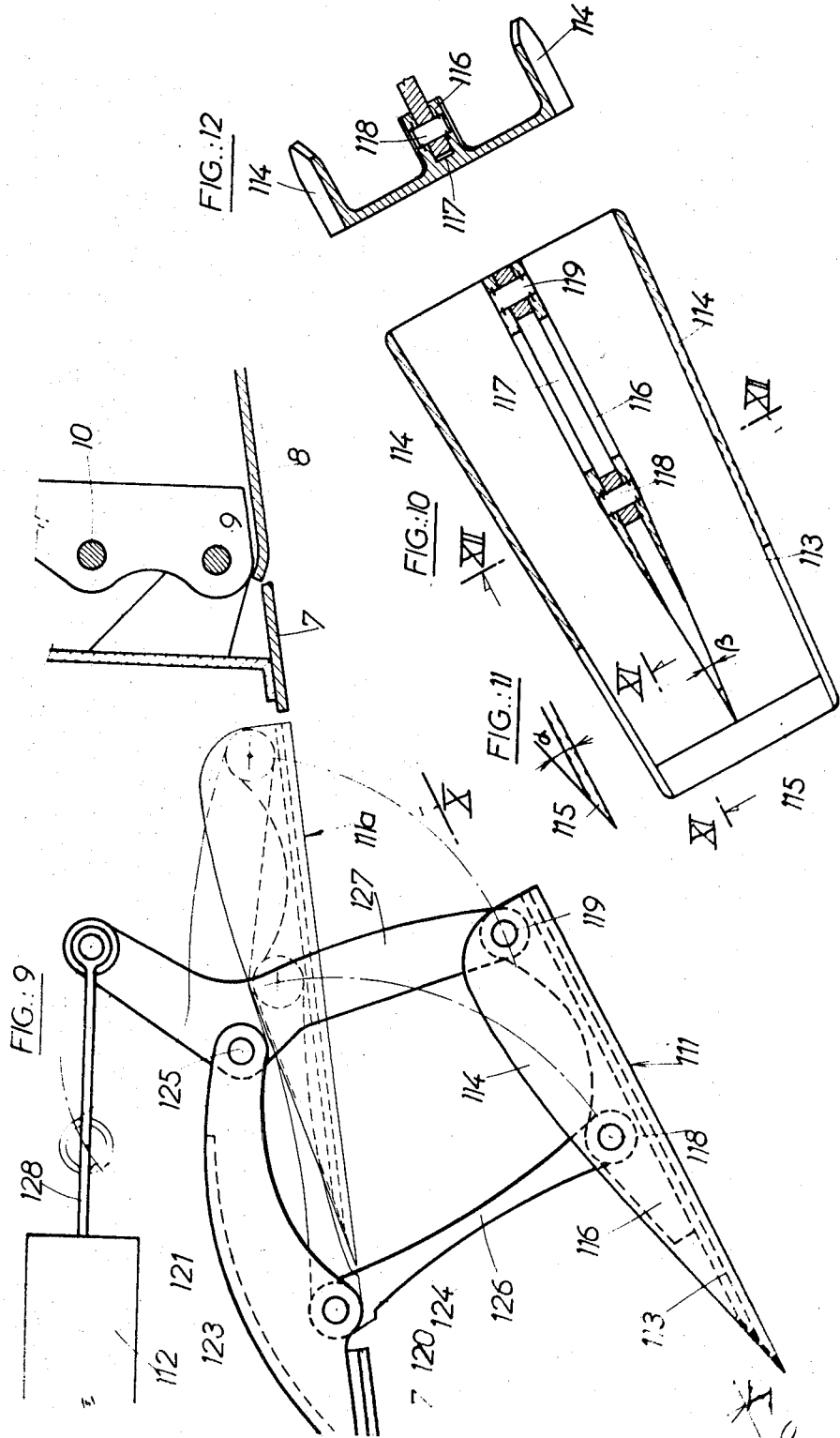

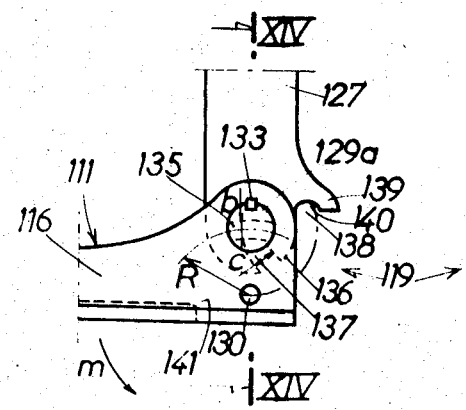
FIG.:13
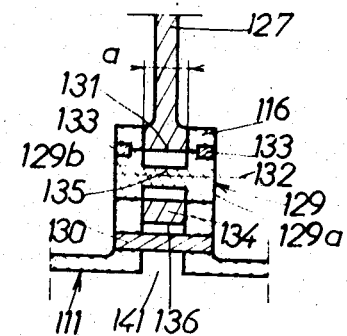
FIG.:14
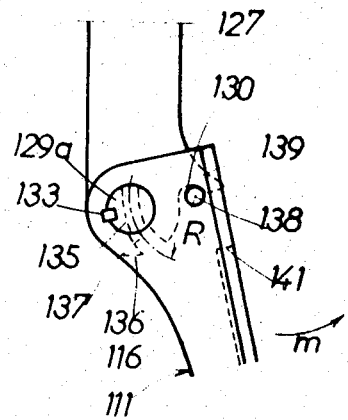
FIG.:15
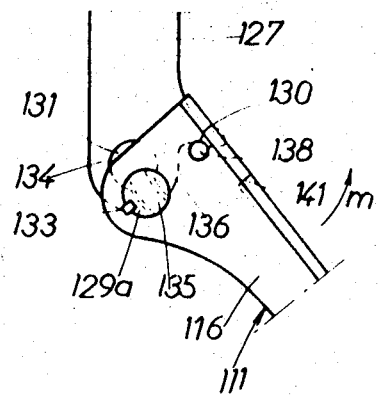
FIG.:16

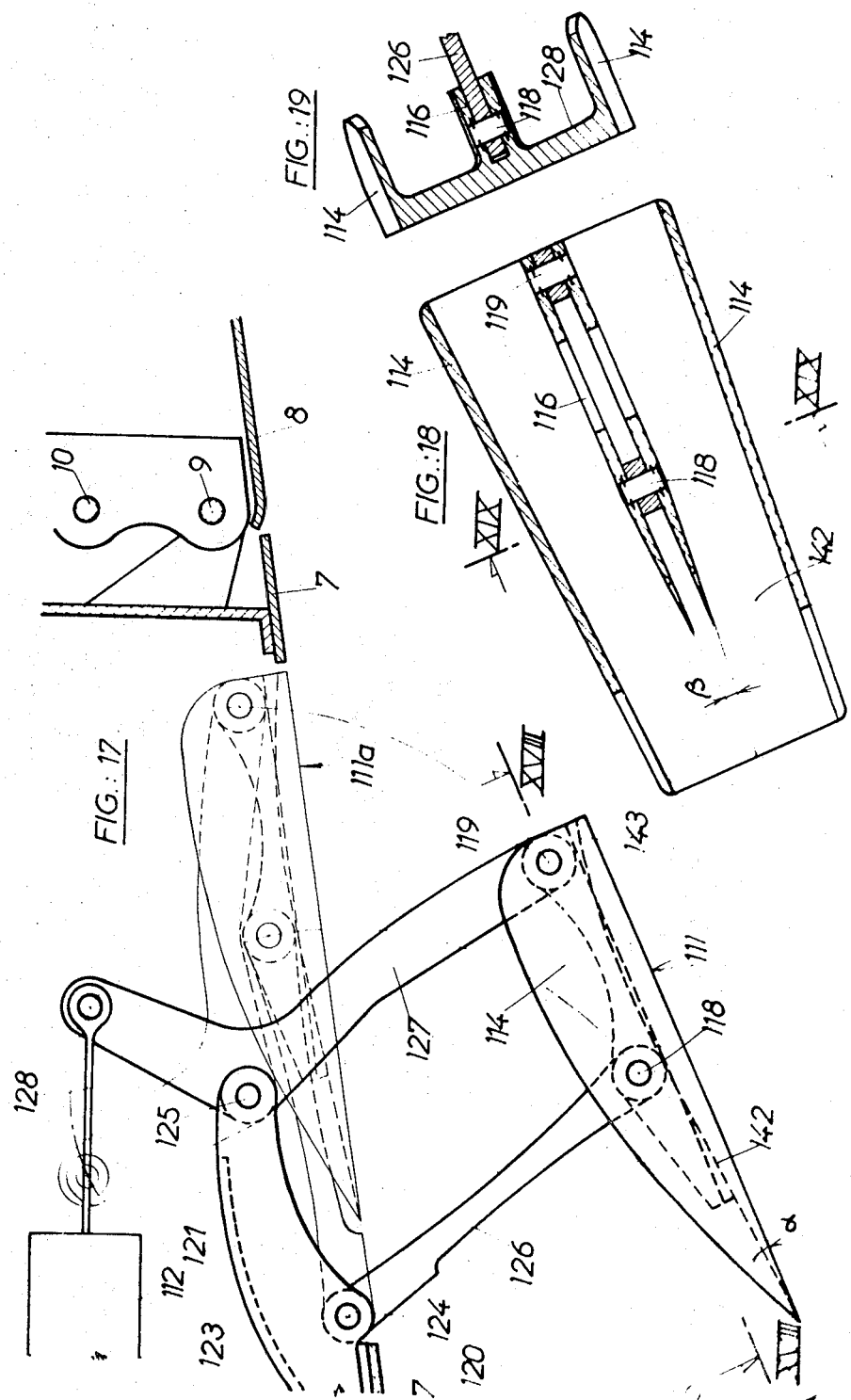

SILENCER DEVICE FOR AN EJECTOR-TYPE JET PROPULSION NOZZLE

This invention relates to a silencer device for an ejector-type jet propulsion nozzle. The term "composite nozzle" is used herein to designate a nozzle system, more especially but not exclusively for jet engines, which includes a primary nozzle and a secondary fairing partially surrounding said primary nozzle and projecting downstream beyond the outlet orifice from said primary nozzle in order to define therewith an annular space through which, in operation, a secondary airflow passes, embracing the gas jet leaving the primary nozzle. The secondary fairing usually presents, downstream of the outlet orifice of the primary nozzle, a throat followed by a divergent portion. As those skilled in the art will be well aware, an arrangement of this kind advantageously enables the system to be matched to supersonic velocities of discharge of the gases.

It is well known that one of the most efficient methods of attenuating the noise produced by a gas jet, escaping at high velocity from a nozzle, consists in increasing the superficial area of the jet in contact with the ambient air in order to promote mixing between gas and air. Such deformation of the jet periphery, however, generally gives rise to a certain loss of thrust and it is for this reason that for aircraft jet engines, movable silencers have been developed, operating to promote mixing with ambient air as above mentioned at takeoff and landing, which can be retracted away from the jet during the cruising phase of flight, when the noise-suppression requirement no longer exists. Thus, the time for which loss of thrust takes place is limited to the minimum possible.

Considering simple nozzles (that is to say nozzles constituted simply by a primary nozzle), therefore, silencers are known which are made up of movable baffles such as strips or vanes regularly distributed around the periphery of the nozzle outlet section and penetrating with their upstream extremities, in the operative or silencing position, into the body of the jet stream in order to tap off, in the manner of a scoop, in the immediate neighbourhood of the nozzle outlet, a certain quantity of gas and deflect it with a radial component towards the exterior into the surrounding atmosphere, thus accelerating the process of mixing between gas and air.

However, experience has shown that these devices rapidly lose efficiency and give rise to severe thrust losses as soon as the expansion ratio of the jet leaving the nozzle reaches any substantial level. In other words, under the effect of the high pressure which it has in the neighbourhood of the nozzle outlet, the jet has a tendency to recover its initial form directly downstream of the said strips or vanes, thus reconstituting the circumstances which favour the production of noise. Thus, if a lasting silencing action is to be achieved, it is necessary to operate in a zone in which the jet is already sufficiently expanded, that is to say at a location relatively well removed from the nozzle outlet.

However, in this respect two difficulties are encountered. The first of these has to do with the fundamental nature of the jet, whose local velocity, after expansion, may be highly supersonic. As a consequence of this fact, the silencer elements introduced into the jet create a substantial drag effect which rises rapidly with increasing depth of penetration into the jet. If this drag or thrust loss is to be limited to a value compatible with the engine performance required during takeoff and climb-away phases, then the silencer elements can only be allowed to penetrate into the jet to a small extent, thus limiting the silencing effect which can be achieved. The second difficulty is bound up with the location of a mounting and articulating system for the strips or vanes, in a zone which is located far downstream of the nozzle outlet. It has already been proposed, in this context, that the strips or vanes be articulated to a ring located downstream of the point of discharge of the nozzle into the atmosphere. However, an arrangement of this kind has little to recommend it, quite apart from the technological difficulties which it creates, because whatever the ring diameter used it gives rise to permanent and substantial losses of thrust either as a consequence of external drag in the case of a large-diameter ring, or as a consequence of an internal drag in the case of a small-diameter ring.

These drawbacks can be avoided in an ejector-type jet propulsion nozzle, due to an appropriate design which forms the subject of the present invention.

In accordance with the invention, the silencer device comprises, distributed around the internal periphery of the secondary fairing and downstream of the outlet from the primary nozzle, a series of movable baffles adapted to be moved between an operative position in which they penetrate with their upstream extremities into the primary jet stream in the manner of a scoop, and an inoperative position in which they are withdrawn into the said fairing.

This arrangement provides a number of advantages. It will be noted, first of all, that this arrangement means that the baffles or scoops can without difficulty be located far downstream of the point of discharge of the primary jet from the nozzle; consequently, the baffles can act in an already expanded zone of said jet, thus ensuring a permanent silencing action. At the same time, it will be noted that in the cruising flight condition, the baffles are retracted into the fairing and can be used to reestablish the continuity of the internal wall thereof, so that there is no loss of thrust in this phase.

It will be noted, again, that the process of mixing between gas and air takes place with secondary air entrained by ejector effect, and not directly with atmospheric air as in the case of a simple nozzle. Since the velocity of this air is intermediate between that of the atmospheric air and that of the primary jet, the shear effect between the two flows is reduced and this factor too contributes, as those skilled in the art will be well aware, to a reduction in the level of the acoustic energy dissipated by the primary jet in relation to what would be the case with a simple nozzle equipped with the known kind of silencer.

Finally, it will be observed that this arrangement, by increasing the area of contact between gas and air, makes it possible to achieve optimum exploitation of the overall space available between the periphery of the primary jet and the internal periphery of the secondary fairing, in order to reinforce the entraining of the secondary flow by ejector effect. The rendering operative of the silencer thus has the effect of creating an increased throughput of secondary air, with the consequence of a thrust gain which goes towards compensating the loss of thrust arising out of the drag created by the baffles or scoops in the primary jet.

In accordance with a first aspect of the invention, the active part of the baffle or scoop comprises by a flat plate, for example of rectangular form. However, this design is not always the most advantageous. In this connection, it will be appreciated that, in other words, in the operative position the scoop may, considered in relation to the flow streamlines of the primary jet, make a considerable angle and this, where the primary flow is supersonic, may give rise to the development of a detached shock wave and consequent losses. For this reason, in accordance with one advantageous embodiment of the invention, the effective portion of the baffle or scoop is curbed so as to present at the upstream end a lip or dihedral of small apical angle, directed, in the silencing position, in alinement with the streamlines of the primary jet. This design of the scoops has the advantage of reducing the shock wave losses in the supersonic primary flow. The dihedral angle in fact gives rise to the development of an attached shock wave which, producing only a very small pressure loss, reduces the local flow velocity in the primary jet in front of the inclined (relative to the flow streamlines in the said jet) part of the scoop, and consequently the drag introduced by this part.

In accordance with another arrangement, some, at least, of the baffles or scoops are equipped with lateral walls or cheeks the purpose of which is to channel those portions of the jet they intercept, and thus reduce the tendency to lateral overflow downstream of the strips or scoops. This kind of overflow would mean, considering a large number of strips or scoops, the risk of the development of an annular gas zone which would obstruct the secondary flow and thus be unfavourable for the purpose of achieving the silencing effect.

In accordance with another arrangement, some, at least, of the baffles or scoops are provided on those of their faces directed towards the internal wall of the secondary fairing, with a longitudinal profile the downstream part of which, at least, is substantially parallel to the longitudinal profile, in this zone, of the said internal wall of said secondary fairing. Preferably, the longitudinal profile of the baffle or scoop will be curved in a substantially continuous manner from the upstream or entry end, to the downstream or exit end. This kind of design has the advantage that where the annular space between periphery of the primary jet and internal wall of the secondary fairing is rather limited, the unfavourable effects relative to propulsive efficiency, which might rise for certain angles of incidence of the baffles or scoops by possible impingement against the internal wall of the fairing, of portions of the jet stream which have been deflected by said baffles or scoops, are avoided, and that the induction of the secondary flow is improved, thus improving simultaneously the propulsive efficiency and the silencing effect.

In accordance with another aspect of the invention, some, at least, of the baffles or scoops are carried on the secondary fairing through the medium of a deformable linkage system so articulated that the displacement of a baffle from its operative position to its inoperative position involves at least one translatory movement having a longitudinal component directed downstream.

In one embodiment, the deformable linkage associated with each of the baffles or scoops in question, has two fixed pivots rigid with the secondary fairing, and two moving pivots rigid with the baffles or scoop, the loci of these pivots, considered in a plane perpendicular to their own axes, being constituted by the corners of a deformable quadrilateral figure one of the moving sides of which, constituted by the baffle or scoop, has an operative position which is upstream of its inoperative position.

Preferably, one of the fixed pivots will be connected to one of the moving pivots through the medium of at least one link whilst the other fixed pivot will be connected to the other moving pivot through the medium of one of the arms of at least one cranked lever whose other arm is connected to an actuator device such as a hydraulic ram. On displacement into its inoperative position, the baffle or scoop thus retracts downstream at the same time that its upstream tip disengages from the jet. In the silencing configuration, the control system associated with the baffle or scoop keeps it engaged in the jet against the action of the force exerted on it by the jet. In the event of breakdown or failure of this control, the force exerted by the jet pressure regains the upper hand and causes the baffle or scoop to retract away from the jet so that the nozzle automatically returns to the normal configuration.

In accordance with another feature of the invention, some, at least, of the baffles or scoops are carried on the secondary fairing through the medium of a deformable linkage, comprising, in respect of each of the baffles or scoops in question, two linkage elements such as links (rods etc.) articulated in each case to the baffle or scoop in such a manner that the connection between the baffle and one of the linkage elements is broken as soon as the angle made between said baffle and said element exceeds a predetermined value, reached in the event of rupture of the connection between the baffle and the other linkage element. This arrangement takes account of the fact that the joints carried by the baffles or scoops and subjected to the thermal and kinetic energy of the jet, operate under difficult conditions and may fail, leaving the baffle or scoop suspended on the remaining joint and projecting continuously into the jet to a considerable depth and at a considerable angle. This kind of situation, which would give rise to the development of thrust losses of such magnitude as to be unacceptable in normal flight, is avoided due to the provision of the device in accordance with this aspect of the invention, which achieves the automatic ejection of the baffle or scoop from the engine under the effect of the jet itself.

In accordance with one embodiment, each of the joints in question has a main pin fixed nonrotationally to one of the elements (baffle or linkage element) to be connected together, and passing through a main bearing formed in the other element in such fashion as to be able to pivot about the geometric axis of said bearing, the latter having an entry portion in the form of a groove opening on to the periphery of said other element and the pin being so formed over that section of its length which passes through said other element, as to be able to slide through said groove by pivoting about an auxiliary geometric axis other than the aforementioned geometric axis of the principal bearing, this as soon as the angle made between the two elements exceeds a predetermined value. Preferably, the auxiliary geometric axis hereinbefore referred to will be defined by the cooperation of an auxiliary pin integral with one of the elements, with an auxiliary bearing formed in the other element, said pin and said bearing being disposed in relation to one another in such fashion as to lock when the angle formed between the two elements pivoting about the geometric axis of the main bearing exceeds a predetermined value.

In accordance with another feature of the invention, the secondary fairing is lined with an acoustic insulating material. It is in fact inside the fairing that the major part of the overall noise is generated. By acoustically lining the fairing, thus the propagation of this fraction of the noise towards the exterior is reduced, in particular where the higher frequencies of the audible spectrum are concerned.

Further features and advantages of the invention will be apparent from the ensuing description referring to the accompanying drawings, which illustrate by way of example, how the invention may be put into effect.

In the drawings:

FIG. 1 is a schematic view in longitudinal half section, of an ejector-type jet propulsion nozzle equipped with a silencer in accordance with one embodiment of the invention;

FIG. 2 is an end view, from the rear, of the nozzle section shown in FIG. 1;

FIG. 3 is a schematic, longitudinal half section through an ejector-type jet propulsion nozzle equipped with a silencer in accordance with another embodiment of the invention;

FIG. 4 is a partial transverse sectional view, taken on the line IV–IV of the nozzle section shown in FIG. 3;

FIG. 5 is a partial transverse section, taken on the line V–V, of the nozzle section shown in FIG. 3;

FIG. 6 is a schematic, longitudinal half section through an ejector-type jet propulsion nozzle equipped with a silencer in accordance with a further embodiment of the invention, said silencer being shown in the operative position;

FIG. 7 is a schematic, transverse half section, on the line VII–VII, through the nozzle shown in FIG. 6;

FIG. 8 is a similar schematic view to that of FIG. 6, showing the silencer in the inoperative position;

FIG. 9 is an elevational view on a larger scale, of the silencer shown in FIG. 6;

FIG. 10 is a sectional view, on the line X–X, through the silencer shown in FIG. 9;

FIG. 11 is a sectional view on the line XI–XI, through a detail of the silencer illustrated in FIG. 10;

FIG. 12 is a sectional view, on the line XII–XII, of the silencer shown in FIG. 10;

FIG. 13 is a partial elevational view of an improved joint design for one of the silencer elements shown in FIG. 6;

FIG. 14 is a partial sectional view on the line XIV–XIV, through the joint design shown in FIG. 13;

FIGS. 15 and 16 are similar views to that of FIG. 13, showing elements of the joint in different positions;

FIG. 17 is a view similar to that in FIG. 9, of a silencer in accordance with another embodiment of the invention;

FIG. 18 is a sectional view, taken on the line XVIII–XVIII, through the silencer shown in FIG. 17; and FIG. 19 is a sectional view, on the line XIX–XIX, through the silencer shown in FIG. 18.

FIGS. 1 and 2 illustrate an ejector-type jet propulsion nozzle forming the rear terminal part of an aircraft jet engine generally designated by the reference 1. The propulsion nozzle comprises a primary nozzle 2, for example a convergent nozzle, with a fixed or variable outlet section, and a secondary convergent-divergent fairing 3 located coaxially in relation to the primary nozzle and extending downstream of the outlet section thereof. The reference 4 designates the external wall of the fairing. The internal wall of the fairing has a convergent portion 5, a throat 6 located downstream of the outlet of the primary nozzle, and a divergent portion 7. Control flaps 8 articulated at 9 to the fairing and adapted for operation at 10 through a system of hydraulic jacks which have not been illustrated, form the downstream part of the secondary fairing. In the deployed position at 8a, the said flaps enable the outlet of said fairing to be partially shut down.

In operation, the hot gases leaving the primary nozzle 2 at a pressure which is still very high, in the direction of the arrow f, form an initially divergent jet the periphery of which is designated by the reference 11. The annular space formed between the internal wall of the secondary fairing and the external wall of the primary nozzle, followed by the periphery 11 of the primary jet, is the location of a secondary airflow in the direction of the arrow F. In accordance with the embodiment of the invention, the baffles 12 extending downstream of the outlet from the nozzle 2, are distributed uniformly around the internal periphery of the secondary fairing and number fourteen, for example, in the case shown in FIG. 2. Each of these baffles is made up of two main parts, firstly a rectangular plate 13 located tangentially and constituting the effective part of the baffle or scoop, and secondly, an angle piece 14 the longer arm of which is fixed at its edge for example by welding, to the scoop 13. The angle piece or bellcrank lever 14 is articulated at its knee point, to a pin 15 carried by a yoke 16 attached to the inside of the divergent portion of the structure of the secondary fairing. The shorter arm of the bellcrank lever is articulated at its extremity 17 to the end of the rod 18 of a hydraulic jack 19 located inside the fairing structure and articulated thereto at the point 20.

Under the action of the jacks 19, the baffles 12 can be moved into two different positions marked respectively in full line and broken line, corresponding respectively as will be explained hereinafter, to the cruising flight and silencing conditions.

Electrical limit switch contacts 21 and 22 enable a pulse, controlling the stopping of the jacks when the respective extreme positions of the baffles have been reached, to be produced.

In the silencing position, at takeoff for example, the strips 12 and, more particularly, their effective part 13, are deployed (position 13a) into the primary jet which is to be silenced, so that they penetrate into it at a zone situated sufficiently far downstream of the outlet from the primary nozzle for the primary jet to be well expanded and thus achieve a "permanent" result. The scoop 13, penetrating into the primary jet stream, removes from it a certain gas flow which it deflects into the space situated between the periphery of said primary jet stream and the internal wall of the secondary fairing, so that downstream of the scoops, this space will be filled with a highly turbulent mixture of primary gas and secondary air entrained by an ejector effect. Mixing of this kind is, as those skilled in the art will be well aware, eminently desirable where attenuation of the noise created by the high velocity, hot primary jet is concerned. Another favourable factor where the reduction in the noise level is concerned, is constituted by the circumstance that the relative velocity of the primary jet relative to the secondary flow, is quite low; the result is that the velocity gradient at the boundary between the two flows is flattened in relation to that which would be obtained in the case of a simple nozzle, thus reducing the effect of shear between the two flows. Finally, it will be observed that the rendering operative of the silencer baffles makes it possible to compensate, at least partially, for the loss in thrust generated by the baffle-induced drag in the primary jet, as a thrust gain arises out of the reinforcement experienced, with the baffles in this position, in the entrainment of secondary air by ejector effect. The gas flow tapped off by the scoops is a function of their width and depth of penetration. It will therefore be seen that for a scoop of given dimensions it is possible to regulate the acoustic attenuation by regulating the depth of penetration of the scoop into the jet, bearing in mind the fact that beyond a certain limit of penetration the thrust loss due to scoop drag may exceed the thrust gain arising out of the reinforcement of the ejector effect, although still remaining within acceptable limits. Accordingly, it is possible in all conditions of use, to adjust for maximum noise attenuation compatible with the load which the engine has to meet. To this end, a device for controlling the jacks 19 may be provided, which acts in a continuous or stepped manner.

In the cruising flight condition, the baffles are retracted completely into the internal wall of the divergent portion 7, reestablishing the continuity thereof, and thus produce no loss of thrust.

FIGS. 3, 4 and 5 relate to a variant embodiment. The general arrangement of the nozzle is similar to that described hereinbefore in relation to FIGS. 1 and 2, with the essential distinctions that firstly the scoops are given a different profile, and that secondly an acoustic lining is provided on the secondary fairing.

As explained hereinbefore, the penetration of a scoop, such as that indicated at 13 in FIG. 1, takes place at a substantial angle to the streamlines of the primary jet. However, it is well knows that the drag losses produced by the presence of an obstacle in a supersonic flow are the greater, the greater is the angle made between the obstacle and the flow direction and the larger is the Mach number. For the case of a flow which has a highly supersonic velocity, this associated with a substantial angle of projection of the scoops into said flow, it may happen that the drag losses due to the silencing action are not acceptable in all cases. This is why, in accordance with an advantageous embodiment of the invention, the scoop 13 of FIG. 1 may be replaced by a scoop 23 of curbed design which has at the upstream end a sharp-edged nose or dihedral 24 of very small apical angle. In the operative position 24a, the nose or leading edge is alined with the streamlines of the primary jet, and accordingly, does not in itself produce anything more than very small losses due to the formation of an attached shock wave at the nose extremity. The primary flow is decelerated locally downstream of this shock wave, upstream of the rest of the scoop, the drag losses of which latter are thus, for the same degree of penetration into the jet, substantially lower than in the case of the scoop 13 shown in FIG. 1.

The control of the actuation of the scoops is effected in the same manner as in the first embodiment. In the inoperative position, the special profile scoops are retracted into the throat of the secondary nozzle, reestablishing continuity of the profile thereof. The internal wall of the secondary fairing, including the secondary flaps 8, is constituted by a perforated sheet 25 and the structure of the fairing is filled, in the region of the divergent portion, the throat and part of the convergent portion, with a sound-damping material 26 of appropriate kind, such as steel wool. It is well known in fact, that a major part of the overall noise is produced over a relatively short distance between the outlet of the primary nozzle and that of the secondary fairing. The acoustic lining of the fairing makes it possible to prevent this fraction of the noise from being transmitted outside. In this fashion, therefore, the overall efficiency of the silencer is improved.

The embodiment of silencer illustrated in FIGS. 6 and 8 is similar, in fundamental principle, to those already described. The baffles or scoops are marked by the general reference 111.

Under the action of jacks 112, these baffles can be caused to occupy an operative or silencing position, as shown in FIGS. 6 and 7, and an inoperative or cruising position, as shown in FIG. 8. In the operative position, each of the baffles or scoops penetrates into the primary jet stream and taps off therefrom, in the manner described hereinbefore, a certain gas flow which is deflected towards the space located between the periphery of the primary jet and the internal wall of the secondary fairing, such that said space becomes filled, downstream of the scoops, with a highly turbulent mixture of primary gas and secondary air entrained by ejector effect.

In the inoperative position, the baffles are retracted fully into the interior wall of the divergent portion 7, reestablishing the continuity thereof, and thus produce no loss of thrust.

As FIGS. 9 to 12 illustrate in more detail, the baffle or scoop 111 has a base 113 bordered laterally, over the whole of its length, by two walls or cheeks 114. The upstream end of the said base in chamfered at the location 115, at an angle $\alpha$ shown in FIG. 11, in order to reduce the drag induced in the primary jet by the baffle and to improve its scoop properties. Following the chamfered region, the baffle has a central rib 116 of varying height, itself chamfered or beveled for similar reasons at its upstream end and in the transverse plane, at an angle $\beta$ shown in FIG. 10, this rib containing over the major part of its length a longitudinal groove 117 through which two pins 118, 119 extend.

The wall of the divergent portion 7 of the secondary fairing contains a series of cutouts 120, equal in number to the number of baffles or scoops, into which the latter can be retracted when the silencer is in the inoperative position so as to substantially reestablish the continuity of the said wall. In the neighbourhood of the upstream end of each of the cutouts, the wall of the divergent portion 7 carries a yoke in the form of two curved profile cheek plates 121, 122 connected with one another by a bridge piece 123 of shorter longitudinal size than the said cheek plates. The two cheek plates, viewed end-on in FIG. 7, are traversed by two pins 124, 125.

The pins 118 and 124 respectively serve for the articulation of the two ends of a link 126. In a similar manner, the pins 119 and 125 provide articulations respectively at the end of one of the arms of a cranked lever 127 and at the knee point of said cranked lever, the extremity of the other arm of the lever 127 being articulated to the extremity of a rod 128 which is the piston rod of the jack 112. If required, sleeves (which have not been illustrated), may be located around these pins 124, 125 at either side of the link and the cranked lever, in order to maintain said elements in the central longitudinal plane of the yoke. The assembly formed by the link, the cranked lever and their respective joint pins, constitutes a deformable linkage through the medium of which the baffle or scoop 111 can be moved from its operative position shown in heavy line in FIG. 9, into its inoperative position 111a shown in light line in said same FIG., or vice versa. In the last-mentioned position, the link 126 and the cranked lever are at least partially lodged in the longitudinal groove 117.

The loci of the pins 118, 119, 124, 125, considered in a plane perpendicular to their own axes, constitute the corners of a deformable quadrilateral figure having two fixed corners 124, 125 carried by the yoke, and two movable corners 118, 119 carried by the baffle or scoop.

It will be seen that during displacement into the inoperative position, the baffle or scoop 111 executes a translatory motion with a longitudinal component which is directed downstream. In other words, this baffle or scoop retracts downstream at the same time that its upstream tip disengages from the jet. In the silencing configuration, the jack 112 associated with the baffle or scoop keeps the latter engaged in the jet against the thrust exerted on it by the same. However, in the event of breakdown or failure of the jack or its control arrangements, the jet pressure gains the upper hand and causes the baffle or scoop to retract so that the nozzle automatically returns to the normal configuration.

The number of links and levers making up the deformation linkage is not limited to what has been described above by way of example. Thus, in place of a single link 126 articulated to the central part of the base of the baffle or scoop, it would be possible to use two links articulated to the walls or cheeks 114 laterally bordering said baffle or scoop, and the same could apply to the cranked lever 127.

The lateral walls or cheeks 114 have the effect of channelling the parts of the jet intercepted by the baffles or scoops, and of preventing or at any rate reducing, the lateral over flow of these deflected parts of the jet gas flow, downstream of said strips or scoops. Were this not the case, it could happen, with a sufficiently large number of baffles or scoops, that the lateral overflow of the jet flow fractions intercepted by consecutive baffles or scoops, could join together and give rise to the development of an annular ring of gas which would at least partially obstruct the flow of secondary air, and this would be unfavourable from the point of view of noise as well as from the point of view of propulsive efficiency. This risk is obviated by the provision of the walls or cheeks 114 whose purpose is to provide separation between each of the jet fractions which are intercepted and deflected.

FIGS. 13 to 16 relate to another embodiment of the invention dealing with the ejection, from the engine, of a baffle or scoop in the event of rupture of one or other of the joints of the linkage elements such as the link 126 or the cranked lever 127. In the example illustrated, it has been assumed that the joint 118 has ruptured and that the baffle or scoop 111, freely suspended from the cranked lever 127 by the joint 119 and acted upon simultaneously by its own weight and the gas force, is tending to turn about the geometric axis of said joint, in accordance with the arrow $m$. These two joints 118 and 119 being similar, only joint 119 has been actually illustrated. The lateral cheeks 114 have been left out of the illustration.

The joint is made up of a main pin 129 passing through the central rib 116 of the baffle or scoop, and an auxiliary pin 130 likewise passing through said rib, the two pins being substantially parallel with one another and situated at a distance R from one another. The main pin 129, which passes through a main bearing 131 of cylindrical form, formed in the cranked lever 127, is fixed at both ends 129a, 129b in the central rib 116. The said ends 129a, 129b have, for example, a cylindrical form, the axis 132 of which is coincidental with that of the main bearing 131, and may be fixed to the rib 116 by means of keys or dowels 133.

Over a length $a$ equal to the thickness of the extremity 134 of the cranked lever 127, the main pin has, between its ends 129a, 129b, an intermediate portion 135 of special shape defined by two substantially cylindrical and parallel surfaces, which surfaces have a common axis constituted by the axis of the auxiliary pin 130. The mean radius of the intermediate portion 135 is equal to R.

The main bearing 131 opens out on to the external periphery 136 of the end 134 of the cranked lever 127, through an opening portion in the form of a groove 137 defined by two substantially cylindrical and parallel surfaces, which surfaces have a common axis 138 whose position will be defined hereinafter. The mean radius of the groove 137 is also equal to R (see FIG. 15).

The cranked lever 127 carries a stop 139 defining an auxiliary bearing 140 intended to receive the auxiliary pin 130 when the baffle or scoop 111 has rotated through a predetermined angle about the axis 132 which is the main axis of articulation. When said pin strikes its bearing or seating 140, its axis constitutes an auxiliary axis which is precisely alined with the axis 138 hereinbefore mentioned.

The thickness $b$ of the intermediate portion 135, is slightly smaller than the thickness $c$ of the groove 137. The downstream extremity of the baffle or scoop is grooved at 141 over the width $a$, in order to permit the baffle or scoop to adopt the positions shown in FIGS. 15 and 16.

The device operates as follows:

After rupture of the joint 118, the baffle or scoop tends to turn, during a first phase, about the main axis 132, until such time as the auxiliary pin 130 hits the auxiliary bearing or seating 140, thus moving from the position shown in FIG. 13 to the position shown in FIG. 15. In this latter position, the intermediate portion 135 of the main pin 129 is located precisely in an extension of the groove 137. From this instant onwards, the pivoting in the direction of the arrow $m$ continues, now in a second phase, about the auxiliary axis 138 of the auxiliary pin 130 which is seated in its bearing 140. The intermediate portion 135 of the main pin then engages in the groove 137, as shown in FIG. 16, and slides across said groove so that the connection between the baffle or scoop 111 and the cranked lever 127 is broken. The baffle or scoop is then liberated and ejected from the back of the engine. The risk of any loss in thrust, referred to hereinbefore, is consequently automatically and reliably avoided.

FIGS. 17, 18 and 19 relate to another feature of the invention, concerned fundamentally with the form of the base profile of the baffle or scoop.

The flat form of the base of the baffle or scoop, as illustrated in the preceding FIGS. may give rise to the problem, if the annular space between the periphery of the primary jet and the internal wall of the secondary fairing, is rather limited, and in certain conditions of inclination of the baffles, that portions of the intercepted and deflected jet will impinge against the said internal wall and this could have an unfavourable effect upon the propulsive efficiency. In accordance with this feature of the invention, such risk is avoided due to the special profiling of the base of the baffle or scoop, this profiling being visible in particular in FIG. 17. The profile, marked by the reference 142, has the effect of tending to direct the intercepted and deflected portions of the primary jet in a line substantially parallel to the internal wall of the divergent section 7. At its upstream end, it has a chamfered or beveled section of angle $\alpha$ shown in FIG. 17, and then curves to terminate in a portion 143 substantially parallel to the profile, in this zone, of the internal wall of the divergent section 7. The deflected jet can thus follow a curvilinear path and there is no risk of it hitting the said internal wall. Thus, not only is the aforementioned loss of efficiency avoided but also the induction of secondary air is improved and this is translated into an improvement both of the propulsive efficiency and the silencing effect.

The control linkage associated with this variant embodiment is identical to that already described, similar references designating similar elements.

It goes without saying that the embodiments described are only examples and may be modified in various ways within the scope of the invention, as defined by the appended claims. Thus, instead of retracting the scoop in the downstream direction into the fairing, it would equally be possible, although the angular travel would be larger, to carry out this retracting motion in the upstream direction. Likewise, the baffles could be articulated to the secondary fairing in such a fashion that the upstream extremity of the scoop penetrates in asymmetrical fashion into the primary jet stream in order to produce a rotational movement of the gas about the nozzle axis and thus further improve the efficiency of the mixing process.

We claim:

1. In an ejector-type jet propulsion nozzle which comprises a primary nozzle and a secondary fairing of larger cross section than the primary nozzle cross section and partially surrounding said primary nozzle as well as extending downstream beyond the outlet orifice of said primary nozzle in order to form with the primary nozzle an annular space through which, in operation, a secondary air flow is developed surrounding the gas jet leaving the primary nozzle, a silencer device comprising:
   a series of baffles;
   means mounting said baffles in distributed array around the interior periphery of the secondary fairing downstream of the outlet of the primary nozzle, the mounting means being such as to permit displacement of said baffles between an operative position, in which they penetrate with their upstream extremities into the primary jet stream in the manner of a scoop, and an inoperative position in which said baffles are retracted into the fairing; and
   control means for moving said baffles between said operative and inoperative positions.

2. A silencer device as claimed in claim 1, wherein each of the baffles comprises an effective portion constituting the scoop proper, supported by a lever system articulated to the secondary fairing.

3. A silencer device as claimed in claim 2, wherein the effective portion of the baffle is in the form of a flat plate.

4. A silencer device as claimed in claim 3, wherein the plate is substantially rectangular in shape.

5. A silencer device as claimed in claim 1, wherein some, at least, of the baffles are provided on that of their faces directed towards the internal wall of the secondary fairing, with a longitudinal profile the downstream portion of which, at least, is substantially parallel to the longitudinal profile of the said internal wall of the said secondary fairing in this zone.

6. A silencer device as claimed in claim 5, wherein the longitudinal profile of the baffle is curved in substantially continuous fashion from the upstream or entry portion up to the downstream or outlet portion.

7. A silencer device as claimed in claim 1, wherein the baffles are curved in order to present a lip or dihedral of small apical angle at the upstream end, so orientated in the silencing position as to be alined with the streamlines of the primary jet.

8. A silencer device as claimed in claim 1, wherein some, at least, of the baffles are articulated to the secondary fairing in such fashion that their upstream extremities penetrate into the primary jet in a symmetrical manner.

9. A silencer device as claimed in claim 1, wherein some, at least, of the baffles are articulated to the secondary fairing in such fashion that their upstream extremities penetrate in a symmetrical fashion into the primary jet stream, in order thus to generate a rotational movement in the gases about the nozzle axis.

10. A silencer device as claimed in claim 1, wherein some, at least, of the baffles are equipped with lateral cheeks.

11. A silencer device as claimed in claim 1, wherein the secondary fairing is lined, at least over that section situated downstream of the plane of outlet from the primary nozzle, with an acoustic insulating material located between the external and internal walls of said fairing, said internal well being in the form of a a perforated sheet at this location.

12. In an ejector-type jet propulsion nozzle which comprises a primary nozzle and a secondary fairing of convergent-divergent profile of larger minimum cross section than the primary nozzle and partially surrounding said primary nozzle as well as extending downstream with the throat of the fairing located downstream of the outlet orifice of the primary nozzle in order to form with the primary nozzle an annular space through which, in operation, a secondary air flow is developed surrounding the gas jet leaving the primary nozzle, a silencer device comprising:
   a series of baffles curved through an angle corresponding to the angle of the throat of said fairing;
   means mounting said baffles in distributed array around the interior periphery of the secondary fairing downstream of the outlet of the primary nozzle, the mounting means being such as to permit displacement of said baffles between an operative position, in which they penetrate with their upstream extremities into the primary jet stream in the manner of a scoop, and an inoperative position in which said strips are retracted into the fairing in the region of the throat; and
   control means for moving said baffles between said operative and inoperative positions.

13. In an ejector-type jet propulsion nozzle which comprises a primary nozzle and a secondary fairing of larger cross section than the primary nozzle cross section and partially surrounding said primary nozzle as well as extending downstream beyond the outlet orifice of said primary nozzle in order to form with the primary nozzle an annular space through which, in operation, a secondary air flow is developed surrounding the gas jet leaving the primary nozzle, a silencer device comprising:
   a series of baffles;

means mounting said baffles in distributed array around the interior periphery of the secondary fairing downstream of the outlet of the primary nozzle, the mounting means for at least some of the baffles, comprising an articulated deformable linkage adapted to permit each said baffle to move from an operative position, in which its upstream portion projects into the primary jet stream, to an inoperative position, in which it is retracted into the fairing, with a motion having at least one translatory component directed downstream; and control means for moving said baffles between said operative and inoperative positions.

14. A silencer device as claimed in claim 13, wherein the linkage, associated with each of the baffles in question, has two fixed pivots attached to the secondary fairing and two movable pivots attached to the baffle, the loci of said pivots considered in a plane perpendicular to their own axes being constituted by the corners of a deformable quadrilateral system one of the moving sides of which, constituted by the baffle, occupies an operative position upstream of its inoperative position.

15. A silencer device as claimed in claim 14, wherein one of the fixed pivots is connected to one of the movable pivots through the medium of at least one link, while the other fixed pivot is connected to the other movable pivot through the medium of one of the arms of at least one cranked lever whose other arm is connected to a device such as a hydraulic jack, for actuating a baffle.

16. In an ejector-type jet propulsion nozzle which comprises a primary nozzle and a secondary fairing of larger cross section than the primary nozzle cross section and partially surrounding said primary nozzle as well as extending downstream beyond the outlet orifice of said primary nozzle in order to form with the primary nozzle an annular space through which, in operation, a secondary air flow is developed surrounding the gas jet leaving the primary nozzle, a silencer device comprising:

a series of baffles;

means mounting said baffles in distributed array around the interior periphery of the secondary fairing downstream of the outlet of the primary nozzle, for movement between an operative position, in which the upstream ends of said baffles project into the primary jet, and an inoperative position in which the baffles are retracted into the fairing, the said mounting means comprising, for at least some of said baffles, two linkage elements articulated to each said baffle each through a connection adapted to break when the angle made between the said baffle and one of said two elements exceeds a predetermined value attained in the event of rupture of the connection between the said baffle and the other of its two associated linkage elements; and control means for moving said baffles between said operative and inoperative positions.

17. A silencer device as claimed in claim 16, wherein each of the joints embodies a main pin secured against rotation in one of the elements including the baffle and linkage elements which are to be connected together, and passing through a main bearing in the other element, in order to be able to pivot about the geometric axis of said bearing, said bearing having an opening portion in the form of a groove opening onto the periphery of said other element, and the pin being designed over that part of its length which passes through said other element, in such fashion as to be able to slide across said groove by pivoting about an auxiliary geometric axes other than that of the main bearing, this as soon as the angle formed between the two elements exceeds a certain predetermined limit.

18. A silencer device as claimed in claim 17, wherein the auxiliary geometric axis is defined by the cooperation of an auxiliary pin, fixed to one of the elements, with an auxiliary bearing formed in the other element, said pin and said bearing being so arranged in relation to one another as to come into contact with one another when the angle made between the two elements pivoting about the geometric axis of the main bearing, exceeds a predetermined value.